(12) United States Patent
Myers et al.

(10) Patent No.: US 7,600,483 B2
(45) Date of Patent: Oct. 13, 2009

(54) MARKER FOR BURIED OBJECTS

(75) Inventors: Denise K. Myers, Washougal, WA (US); Charles C. Kirkham, Corbett, OR (US)

(73) Assignee: Radar Engineers, Inc., Portland, OR (US)

( * ) Notice: Subject to any disclaimer, the term of this patent is extended or adjusted under 35 U.S.C. 154(b) by 450 days.

(21) Appl. No.: 11/469,350

(22) Filed: Aug. 31, 2006

(65) Prior Publication Data

US 2007/0053741 A1    Mar. 8, 2007

Related U.S. Application Data

(60) Provisional application No. 60/713,258, filed on Aug. 31, 2005.

(51) Int. Cl.
*G01D 21/00* (2006.01)
*F16L 1/11* (2006.01)

(52) U.S. Cl. ................................ 116/209; 116/212

(58) Field of Classification Search ............. 116/209, 116/212, DIG. 14; 24/16 PB, 589.1, 659, 24/700, 701; 138/104; 224/258; 248/59, 248/60; 405/157
See application file for complete search history.

(56) References Cited

U.S. PATENT DOCUMENTS

| | | | | | |
|---|---|---|---|---|---|
| 1,086,442 | A | * | 2/1914 | Cornelius | 248/59 |
| 2,532,680 | A | * | 12/1950 | Snyder | 24/612 |
| 3,392,426 | A | * | 7/1968 | Mathison et al. | 24/698.2 |
| 3,403,430 | A | | 10/1968 | Steinborn | |
| 3,523,515 | A | | 8/1970 | Brown | |
| 4,991,536 | A | | 2/1991 | Moshofsky | |
| 5,269,565 | A | * | 12/1993 | Langner | 285/2 |
| 5,467,729 | A | * | 11/1995 | Yamada et al. | 116/209 |
| 5,771,835 | A | * | 6/1998 | Schneider | 116/209 |
| 5,881,435 | A | * | 3/1999 | Jermyn, Jr. | 24/16 PB |
| 7,451,721 | B1 | * | 11/2008 | Garza et al. | 116/209 |

FOREIGN PATENT DOCUMENTS

EP           165370 A1 * 12/1985

* cited by examiner

*Primary Examiner*—R. A. Smith
(74) *Attorney, Agent, or Firm*—Klarquist Sparkman, LLP

(57) ABSTRACT

A marker for locating an underground object such as a utility line features an elongate, flexible body, with an aperture near one end. The aperture has a "keyhole" shape which imparts sufficient stiffness in the marker so that it does not readily bend or flex at the aperture when handling the marker, while also allowing the marker to break near the aperture when a firm force is applied to the marker.

19 Claims, 2 Drawing Sheets

MARKER FOR BURIED OBJECTS

CROSS-REFERENCE TO RELATED APPLICATION

This application claims the benefit of U.S. Provisional Patent Application No. 60/713,258, titled "Marker for Buried Objects" and filed Aug. 31, 2005, which is incorporated herein by reference.

TECHNICAL FIELD

The present application relates to markers for underground objects.

BACKGROUND

During the construction of housing units, office buildings, factories, parks, road ways, etc., it is common for underground objects such as utility lines to be installed. It is often useful to know the location, depth, and direction of these lines. To this end, various marking devices have been developed, including a plastic strap in a wrap-around, locking configuration.

One known form of marker is one that is connected to an underground object such as a utility line by wrapping one end of the marker around the object and securing this end to a mid region of the marker so as to hold the marker in place. The remainder of the marker then extends upwardly from the object to be exposed above the surface of the ground after back filling and burying the object. To allow the marker to be released from the underground object with a sharp tugging force (but not with a light tugging force), some markers feature a collapsible tongue which passes through an oval-shaped aperture in the marker. See, e.g., U.S. Pat. No. 4,991,536, which is incorporated herein by reference. The marker may also break at a relatively wide range of force.

There exists a continuing need for improved markers for buried objects.

SUMMARY

A marker is described herein which features a "keyhole"-shaped aperture. The dimensions of the aperture are such that the marker is relatively stiff adjacent the keyhole to minimize bending or flexing when handling the marker prior to installation, but allows the marker to break near the aperture under a relatively narrow and predictable range of force when it is secured to a buried object. The marker can be made from, among other materials, conventional thermoplastic resins.

In one representative embodiment, the marker comprises a flexible, elongate body having first and second end portions and an aperture formed in the first end portion. The aperture has a first portion and a second portion, the first aperture portion being elongated lengthwise of the marker and the second aperture portion being elongated widthwise of the marker and having a width that is greater than the width of the first aperture portion. The aperture accommodates the passage of the terminal end of the first end portion such that the first end portion can be wrapped around the object and pulled through the aperture to secure the marker to the object. The aperture is configured such that a portion of the body adjacent the aperture severs when the marker is subjected to a force greater than a predetermined threshold, allowing the marker to be pulled free of the object.

In another representative embodiment, a method of marking an underground object is provided. The method comprises wrapping a first end portion of a marker around the object, the marker comprising a flexible, elongate body having first and second end portions and an aperture formed in the first end portion. The aperture has a first portion and a second portion, the first aperture portion being elongated lengthwise of the marker and the second portion being elongated widthwise of the marker and having a width that is greater than the width of the first portion. The method also includes inserting the first end portion through the aperture and pulling it snugly around the object.

In an additional representative embodiment, a marker comprising a flexible, elongate body having first and second end portions and an aperture formed in the first end portion. The first end portion has a total transverse cross-sectional area through the aperture in the range of about 0.0206 square inches to about 0.0270 square inches. The marker can be secured to the object by wrapping the first end portion around the object and pulling it through the aperture. The aperture is configured such that when the marker is secured to the object and the object is buried, the marker can break at a location adjacent the aperture when a force greater than a predetermined threshold is exerted on the marker.

The foregoing and other objects, features, and advantages of the disclosed technology will become more apparent from the following detailed description, which proceeds with reference to the accompanying figures.

DETAILED DESCRIPTION

Figure 1:
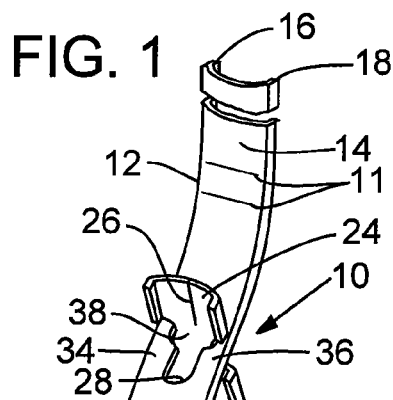
FIG. 1 is a perspective view of a marker and showing the marker with an end portion thereof wrapped around a buried line, according to one embodiment.
Figure 3:
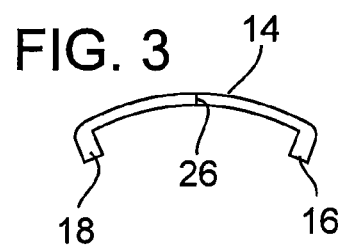
FIG. 3 is an end view of the marker, taken generally along the line 3-3 in FIG. 2.

Referring now to FIG. 1, the marker 10 in the illustrated embodiment takes the form of an elongate ribbon-like body 12 which may be prepared from an extrusion of a plastic such as a polycarbonate, a polyethylene, or a polyvinylchloride (PVC) resin, or any of various other suitable materials. The body 12 has a sufficient length to enable it to be wrapped around a buried object 32 (e.g., a pipe or conduit) to be identified and to extend upwardly from this wrapping and slightly above the surface of the ground. Typically, the body might have a length ranging from about 50 to 80 inches, but obviously other lengths can easily be produced. For ease of reference, the "upper" section of marker 10 is the section that, once the marker 10 is buried, is near or above the surface of the ground; the "lower" section of marker 10 is the section near or wrapped around the object 32.

The body may be prepared with a central expanse 14 which curves slightly extending from one side margin of the body to its opposite side margin. Flanges 16, 18 may extend the length of the body and serve to impart stiffness and lateral rigidity. Flanges 16, 18 may also extend from the central expanse 14 at any desired angle.

Figure 2:
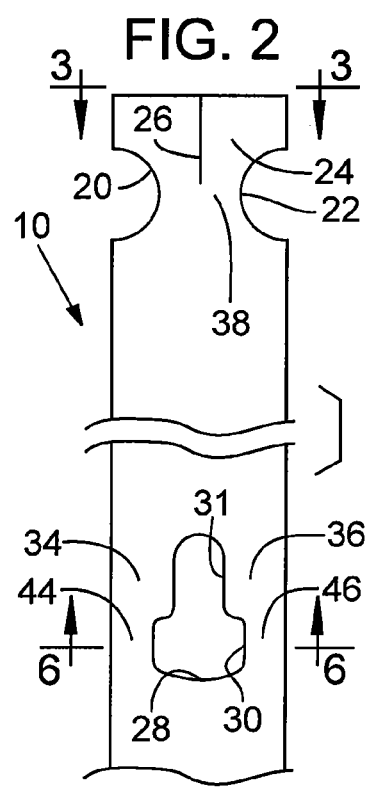
FIG. 2 is a plan view, on a slightly larger scale, illustrating an end portion of the marker.

Illustrated in FIG. 2 at 20, 22 are a pair of opposed indents in opposite margins of body 12 located in a region adjacent but spaced inwardly slightly from one end of the body. The indents, which are optional, may take the form of semicircular cutouts. Separating the indents is ribbon portion 38.

A tongue 24 of the body 12 extends from the upper end as illustrated in FIG. 2, to the region of indents 20, 22. In one embodiment, usually one also featuring indents 20, 22, a slit or division 26 extends longitudinally along the body 12, dividing the tongue 24 into two segments.

Figure 5:
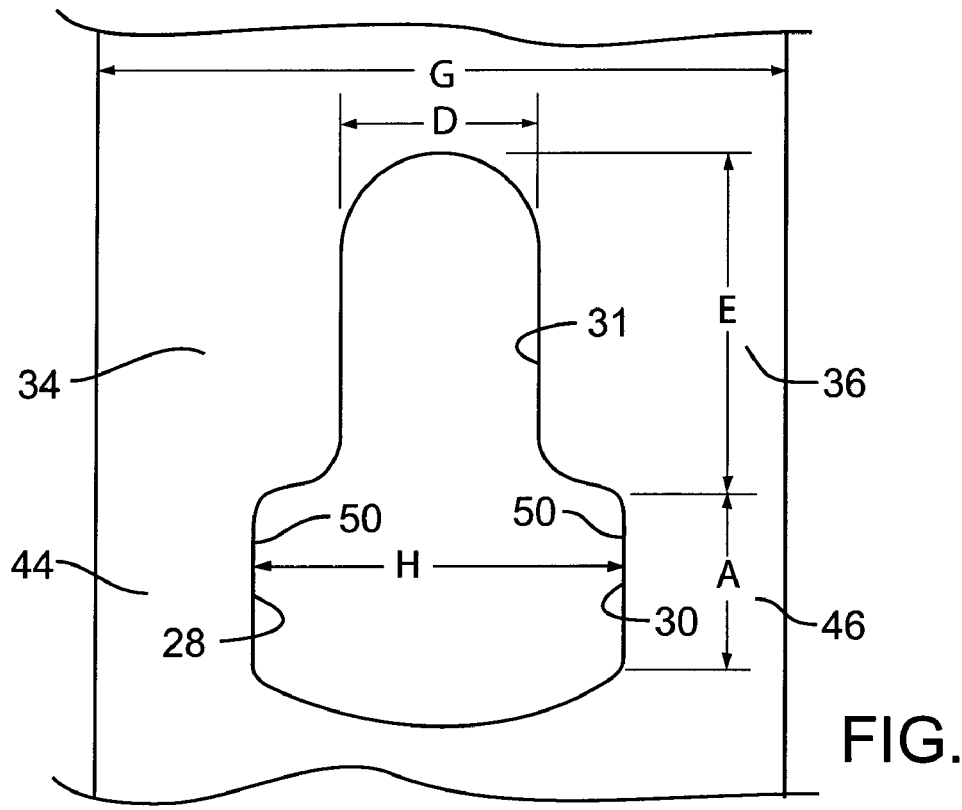
FIG. 5 is an enlarged, partial plan view of the marker.

Also formed in the tail portion 40 of the body 12 (the lower end portion of the body when installed) is an aperture 28. A more detailed depiction of aperture 28 appears in FIG. 5. In the shown embodiment, aperture 28 has a "keyhole" shape, comprising a second portion 30 elongated widthwise of the marker and in communication with a relatively narrow first portion 31 elongated lengthwise of the marker. The second portion 30 has a width H that is greater than the width D of the first portion 31.

In use, as shown in FIG. 1, the second portion 30 forms the "upper" portion of the aperture and the first portion 31 forms the "lower" portion of the aperture. Alternatively, the aperture 28 can be rotated 180° from the position shown in FIG. 1 such that the first portion 31 forms the upper portion of the aperture and the second portion 30 forms the lower portion of the aperture.

The second portion 30 desirably is formed with opposed, straight side edges 50 (referred to as "lands" or "flats") extending lengthwise of the marker. The distance A measures the length of the side edges 50. The length A of the lands 50 preferably is selected to be long enough to avoid the formation of stress risers in the marker (which can cause premature breakage) and short enough to avoid bending or flexing of the marker at the aperture 28 under its own weight when handling the marker so as to prevent pre-stressing or weakening of the marker before it is installed. Although variable, distance A in certain embodiments is about 0.1 inch to about 0.5 inch. In a specific example, the length A of the land 50 is about 0.125 inches, plus or minus 0.003 inch for manufacturing tolerances. Of course, these specific dimensions (as well as other dimensions provided in the present specification) are given to illustrate the technology and not to limit it. The dimensions provided herein can be modified as needed in different applications or situations.

Figure 8:
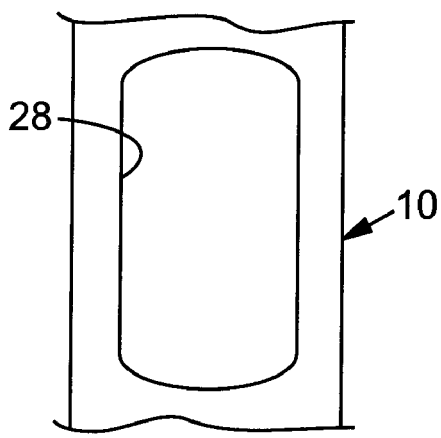
FIG. 8 is an enlarged partial plan view of a marker showing an alternative shape for the aperture.
Figure 9:
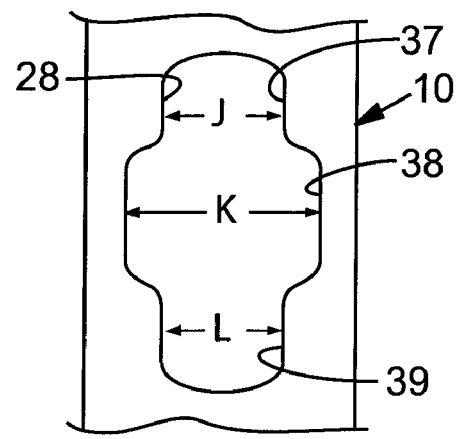
FIG. 9 is an enlarged partial plan view of a marker showing an alternative shape for the aperture.

Alternative shapes for the aperture 28 include: an oval shape having straight sides extending lengthwise of the marker between curved upper and lower ends (FIG. 8); and a cross shape including a widened portion positioned between the ends of an oblong aperture (FIG. 9). For the cross shape of FIG. 9, the aperture 28 can comprise: a first portion 37 forming an "upper" portion of the aperture; a second portion 38 forming a "middle" portion of the aperture; and a third portion 39 forming a "lower" portion of the aperture. As shown in FIG. 9, the first portion 37 can have a width J, the second portion 38 can have a width K, and the third portion 39 can have a width L, where K>J and K>L. The widths J and L can be approximately the same or different.

Figure 6:
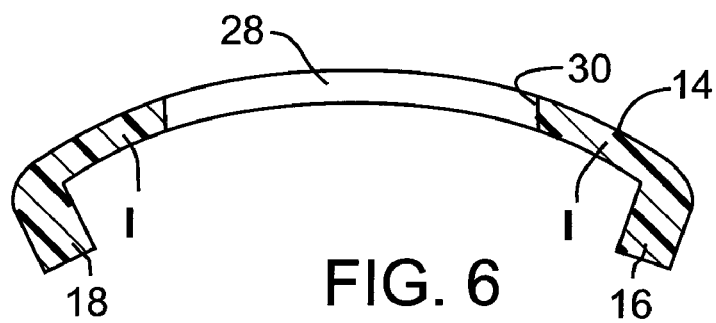
FIG. 6 is a cross-sectional view of the marker, taken generally along the line 6-6 in FIG. 2.

The tail portion 40 has a reduced transverse cross-sectional area at expanses 44, 46 between the outer margins of the marker and the sides 50 of the aperture 28. When the tail portion 40 is wrapped around a buried object 32 in the manner shown in FIG. 7, the marker can break at the expanses 44, 46, as described in greater detail below. The dimensions of the aperture 28 are selected to provide a controlled breakaway at the expanses 44, 46 when a sharp tugging force is applied to the marker 10, for example, when the upper, exposed end of the marker becomes caught on excavating equipment. For example, the ratio of the width H of the upper portion 30 of the aperture 28 to the width G of the central expanse 14 (the overall width of the maker) as well as the cross-section of the marker through the second portion 30 affect the amount of force required to break in the area of the aperture 28. In particular embodiments, the total transverse cross-sectional area I of the marker 10 (on both sides of the aperture) through the second portion 30 of the aperture (FIG. 6) is in the range from about 0.0206 in$^2$ to about 0.0270 in$^2$.

In a working embodiment, the marker is made of PVC. The total cross-sectional area I is about 0.0238 in$^2$, the width H is about 0.670 inch, and the overall width G is about 1 inch (providing a ratio H/G of about 0.67). The width D of the second portion is about 0.500 inch, and the length E of the second portion 31 is about 0.900 inch. The marker 10 in this embodiment has a breakage range of about 95-130 pounds of force, providing a much more controlled and predictable breakaway. The keyhole shape of aperture 28 provides for a controlled breakaway at the second portion 30 of the aperture while also imparting enough stiffness to the marker 10 so that it does not readily bend or flex when handling the marker. This minimizes pre-stressing or weakening of the marker at the aperture prior to installation.

It should be noted that the values for dimensions G, H, and D mentioned above are measured when the central expanse 14 of the marker 10 is flat.

Figure 7:
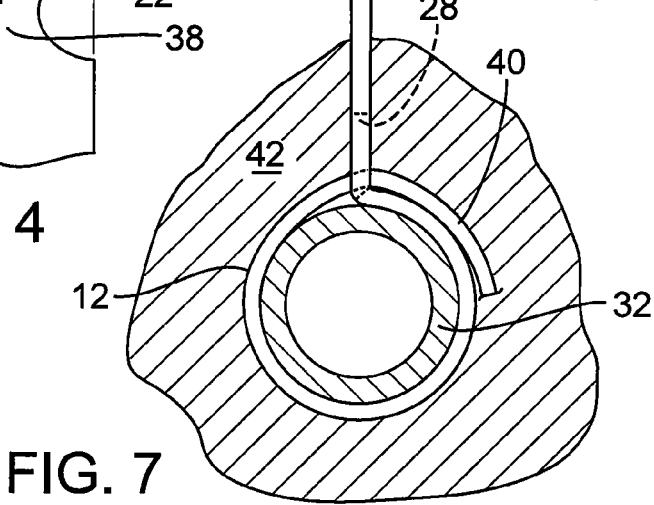
FIG. 7 is a side view of a marker showing an end thereof wrapped around a buried object.

FIG. 7 shows one technique for securing the marker 10 to an object 32. The tail portion 40 of the marker 10 is wrapped around the object 32 and fed through the aperture 28. The tail portion 40 is pulled tightly or cinched around the object 32 and is held in place around the object by backfill 42. This mounting provides a relatively secure connection preventing detachment of the marker 10 with only a slight tugging force exerted on the exposed end of the marker. When a force of significant magnitude is exerted on a marker 10, typically one of the expanses 44, 46 elongates, and then the other expanse elongates, after which time both expanses break, allowing the marker to be pulled free without any damage to the object 32.

The marker 10 may further comprise measurement markings 11 (e.g., numerical indicia, text, and/or symbols), such as on the central expanse 14, which can be useful in indicating the depth of the object 32. The markings can extend from approximately the region near aperture 28 to the upper end of marker 10.

Figure 4:
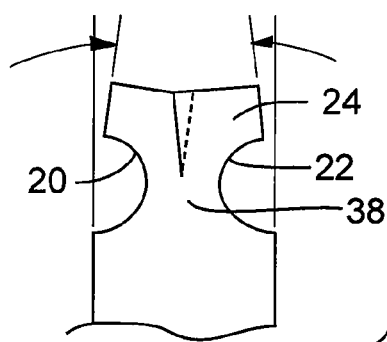
FIG. 4 illustrates how a collapsible tongue portion in the marker collapses to effectuate release of the marker from a buried object.

Alternatively, if the marker 10 features the indents 20, 22, it can be secured to an object 32 in the manner shown in FIG. 1. This is done by reversely turning on itself the tail portion 40 of the marker which includes the collapsible tongue portion 24. The tongue portion 24 is then threaded through the aperture 28. The indents 20, 22 define a seated position with expanses 44, 46 on either side of aperture 28 extending through respective ones of the indents. The portion 38 which separates the indents 20, 22 seats adjacent a rounded upper end of aperture 28. This mounting method may be desirable if, for example, the diameter of object 32 is too large to permit a sufficient amount of the tail portion 40 to be pulled through the aperture 28 and held in place by the backfill 42. In this arrangement, in the event a force of significant magnitude is applied to the free end of the marker 10, the tongue portion 24 slot detaches from the aperture 28, enabling the marker 10 to be pulled free without any damage to object 32. This freeing of the marker end is the result of the tongue portion 24 collapsing as shown in FIG. 4, with shifting to incline positions of the edges of the indents which rest on expanses 44, 46. The net result is that at a certain force level the end of the marker pulls free of its mounting. By changing the length of division 26, the level of applied force producing collapsing of the tongue 24 may be adjusted.

In view of the many possible embodiments to which the principles of the disclosed invention may be applied, it should be recognized that the illustrated embodiments are only preferred examples of the technology and should not be taken as limiting the scope of the invention. Rather, the scope of the invention is defined by the following claims. We therefore claim as our invention all that comes within the scope and spirit of these claims.

We claim:

1. A marker for locating an underground object, the marker comprising:
   a flexible, elongate body having first and second end portions and an aperture formed in the first end portion, the aperture comprising a first portion and a second portion, the first aperture portion being elongated lengthwise of the marker and the second aperture portion being elongated widthwise of the marker and having a width that is greater than the width of the first aperture portion;
   the aperture accommodating the passage of the terminal end of the first end portion such that the first end portion can be wrapped around the object and pulled through the aperture to secure the marker to the object; and
   the aperture being configured such that a portion of the body adjacent the aperture severs when the marker is secured to the object and is subjected to a force greater than a predetermined threshold, allowing the marker to be pulled free of the object.

2. The marker of claim 1, wherein the second aperture portion has opposing first and second straight sides extending lengthwise of the marker.

3. The marker of claim 2, wherein the length of the sides is between about 0.1 inch and 0.5 inch.

4. The marker of claim 1, wherein the ratio of the width of the second aperture portion to the width of the marker is approximately 0.67.

5. The marker of claim 1, wherein the elongate body has a curved transverse cross-sectional profile.

6. The marker of claim 1, wherein the body further comprises a central portion having opposing longitudinal side edges and flanges projecting from the side edges and extending substantially the length of the body.

7. The marker of claim 1, wherein the aperture further comprises a third portion, the first and third portions extending from opposite sides of the second portion, the third portion being elongated Lengthwise of the marker and having a width that is less than the width of the second aperture portion.

8. The marker of claim 1, wherein the second aperture portion is configured to avoid the formation of one or more stress risers in the marker when a force is applied to the second end portion.

9. The marker of claim 1, wherein the second aperture portion is configured to avoid bending of the first end portion of the aperture under the weight of the marker during handling.

10. The marker of claim 1, wherein the first end portion comprises a slit extending generally lengthwise of the marker from the terminal end.

11. The marker of claim 1, wherein the elongate body comprises an extruded plastic.

12. A method of marking an underground object, the method comprising:
    wrapping a first end portion of a marker around the object, the marker comprising a flexible, elongate body having first and second end portions and an aperture formed in the first end portion, the aperture comprising a first portion and a second portion, the first aperture portion being elongated lengthwise of the marker and the second portion being elongated widthwise of the marker and having a width that is greater than the width of the first portion; and
    inserting the first end portion through the aperture, wherein the aperture is configured such that when a force greater than a predetermined threshold is applied to the second end of the marker, the first portion of the marker can break at a location adjacent the aperture, allowing the marker to be pulled free of the object.

13. The method of claim 12, wherein the first end portion of the marker further comprises two or more indents, and wherein inserting the first end portion through the aperture comprises seating the indents in the second portion of the aperture.

14. The method of claim 12, further comprising retaining the second end portion of the marker in an upright position while burying the object.

15. The method of claim 12, wherein the marker comprises measurement markings which allow personnel to determine a depth of the object.

16. The method of claim 12, wherein the aperture further comprises a third portion, the third portion being adjacent to the second portion, being elongated lengthwise of the marker, and having a width that is less than the width of the second aperture portion.

17. A marker for locating an underground object, the marker comprising:
    a flexible, elongate body having first and second end portions and an aperture formed in the first end portion, the first end portion having a transverse cross-sectional area through the aperture in the range of about 0.0206 square inches to about 0.0270 square inches;
    wherein the marker can be secured to the object by wrapping the first end portion around the object and pulling it through the aperture, the aperture being configured such that when the marker is secured to the object and the object is buried, the marker can break at a location adjacent the aperture when a force greater than a predetermined threshold is exerted on the marker.

18. The marker of claim 17, wherein the aperture has opposing first and second straight sides extending lengthwise of the marker.

19. The marker of claim 17, wherein the aperture comprises a first aperture portion, a second aperture portion and a third portion arranged in a cross shape, the first aperture portion being elongated lengthwise of the marker, the second aperture portion being elongated widthwise of the marker and having a width that is greater than the width of the first aperture portion, and the third portion being adjacent to the second portion, being elongated lengthwise of the marker, and having a width that is less than the width of the second aperture portion.

* * * * *